United States Patent
Powell et al.

(10) Patent No.: US 6,525,829 B1
(45) Date of Patent: Feb. 25, 2003

(54) METHOD AND APPARATUS FOR IN-SITU MEASUREMENT OF THICKNESS OF COPPER OXIDE FILM USING OPTICAL REFLECTIVITY

(75) Inventors: Ronald A. Powell, San Carlos, CA (US); E. Derryck Settles, Sunnyvale, CA (US); Sridhar K. Kailasam, Santa Clara, CA (US)

(73) Assignee: Novellus Systems, Inc., San Jose, CA (US)

(*) Notice: Subject to any disclaimer, the term of this patent is extended or adjusted under 35 U.S.C. 154(b) by 0 days.

(21) Appl. No.: 09/865,870

(22) Filed: May 25, 2001

(51) Int. Cl.[7] .............................................. G01B 11/06
(52) U.S. Cl. ...................................... 356/630; 356/632
(58) Field of Search ................................ 356/630, 631, 356/632; 438/14, 16

(56) References Cited

U.S. PATENT DOCUMENTS

| | | | | |
|---|---|---|---|---|
| 4,957,370 A | * | 9/1990 | Tominaga et al. | 356/632 |
| 5,633,121 A | * | 5/1997 | Namiki et al. | 356/601 |
| 6,056,434 A | * | 5/2000 | Champetier | 219/411 |
| 6,348,967 B1 | * | 5/2002 | Nelson et al. | 356/432 |
| 6,437,868 B1 | * | 8/2002 | Coult et al. | 118/712 |

* cited by examiner

Primary Examiner—Georgia Epps
Assistant Examiner—Saeed Seyrafi
(74) Attorney, Agent, or Firm—Skjerven Morrill LLP

(57) ABSTRACT

A method and apparatus for performing reflectometry using a specific wavelength or a small number of specific wavelengths within a spectral range to detect the presence of a copper oxide film on a substrate or to measure the film thickness is described. A method for analyzing reflectivity data to obtain film thickness is also described. Using the described method and apparatus, reflectometry can be performed using only one or two wavelengths of light so that simple photodiode detectors may be used instead of a complex and costly spectrometer (although a spectrometer may be used to detect the reflected light). Therefore, the described invention can provide in-situ or vacuum integrated metrology with simple, low-cost hardware. Finally, the described method does not require detailed curve fitting and thus the necessary thickness data can be acquired rapidly.

12 Claims, 5 Drawing Sheets

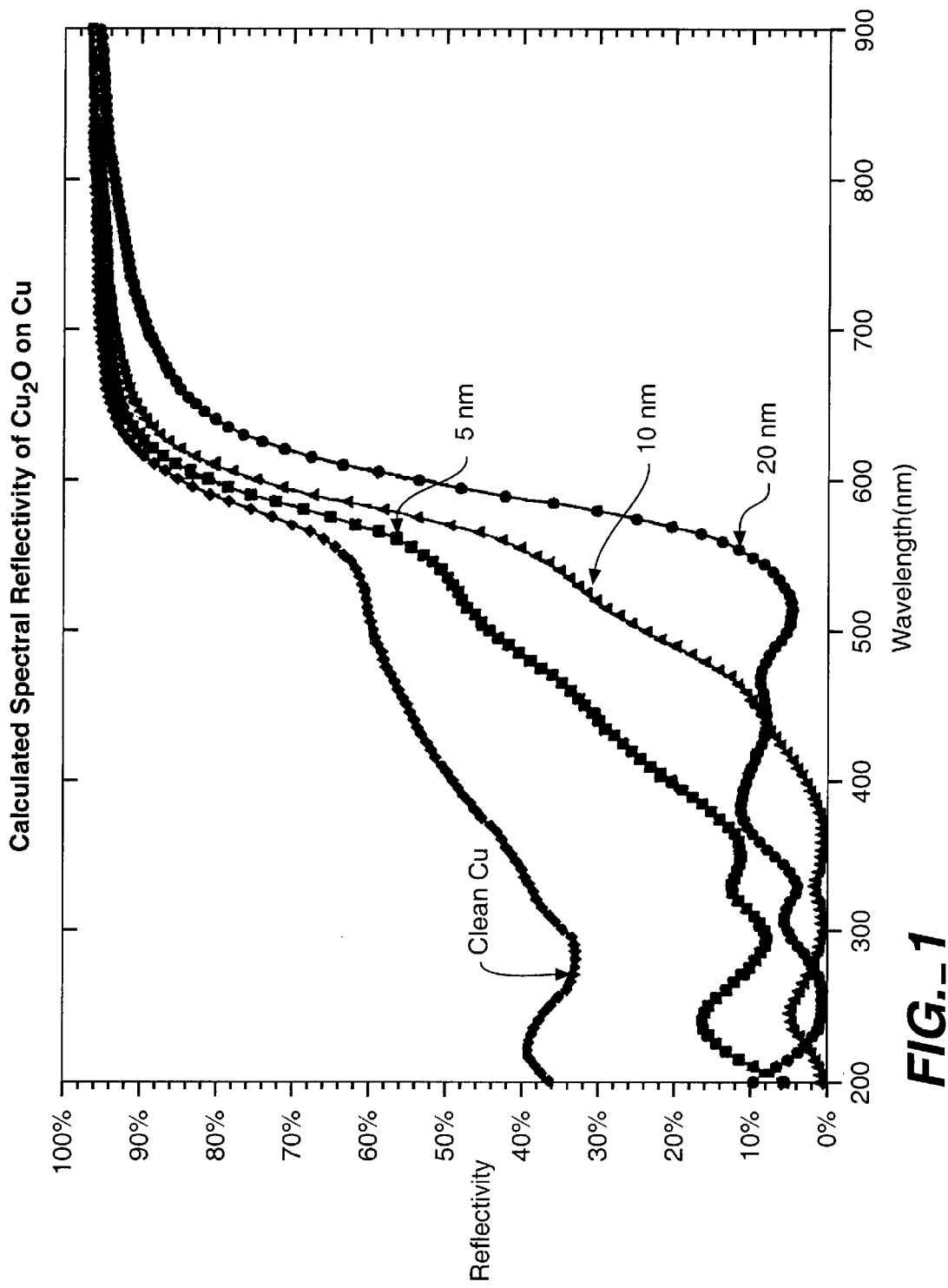
FIG._1

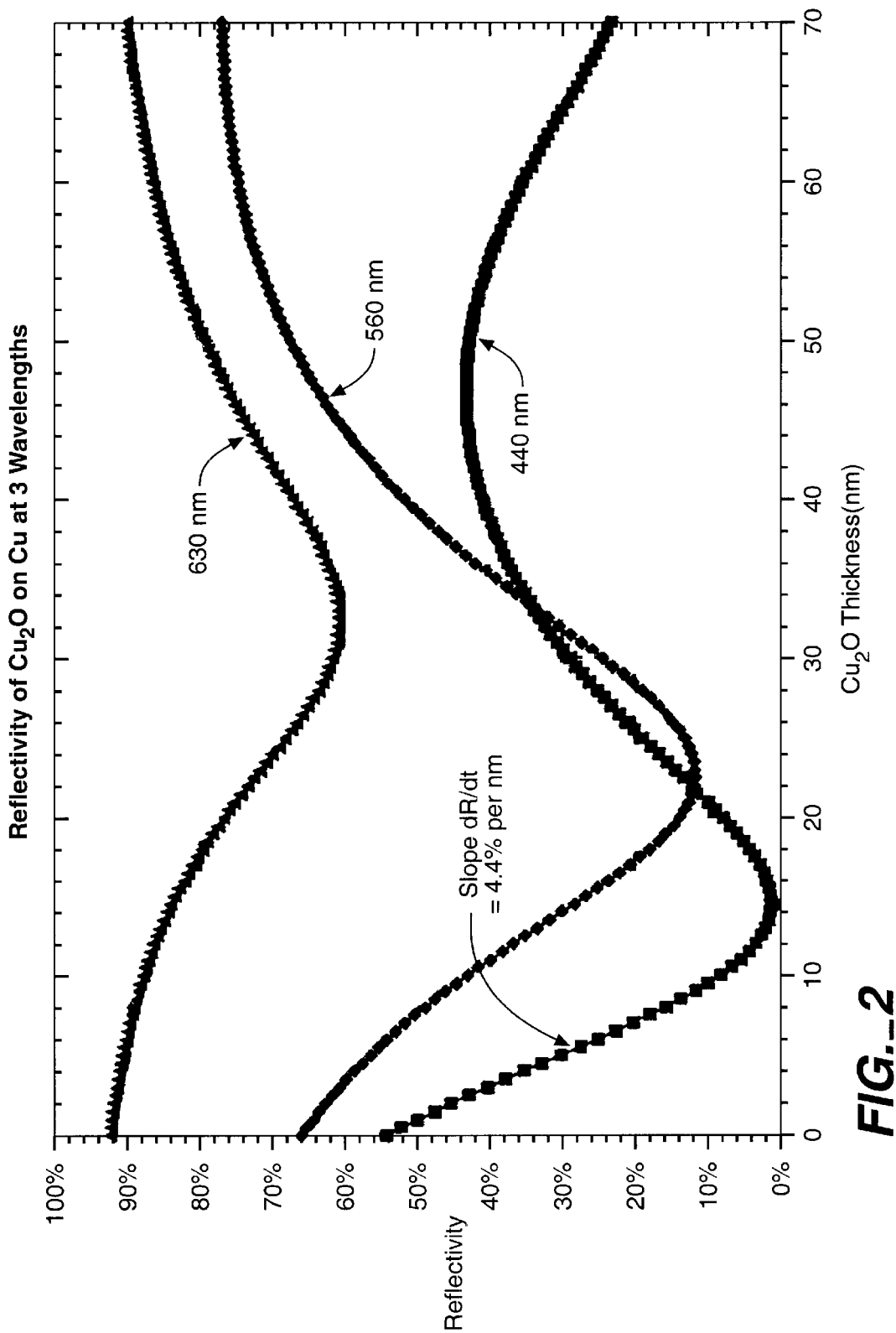
FIG._2

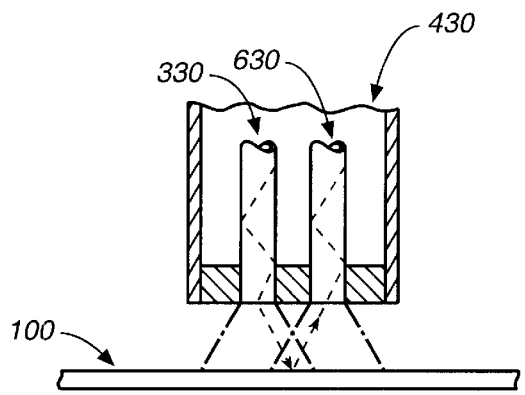
FIG._5
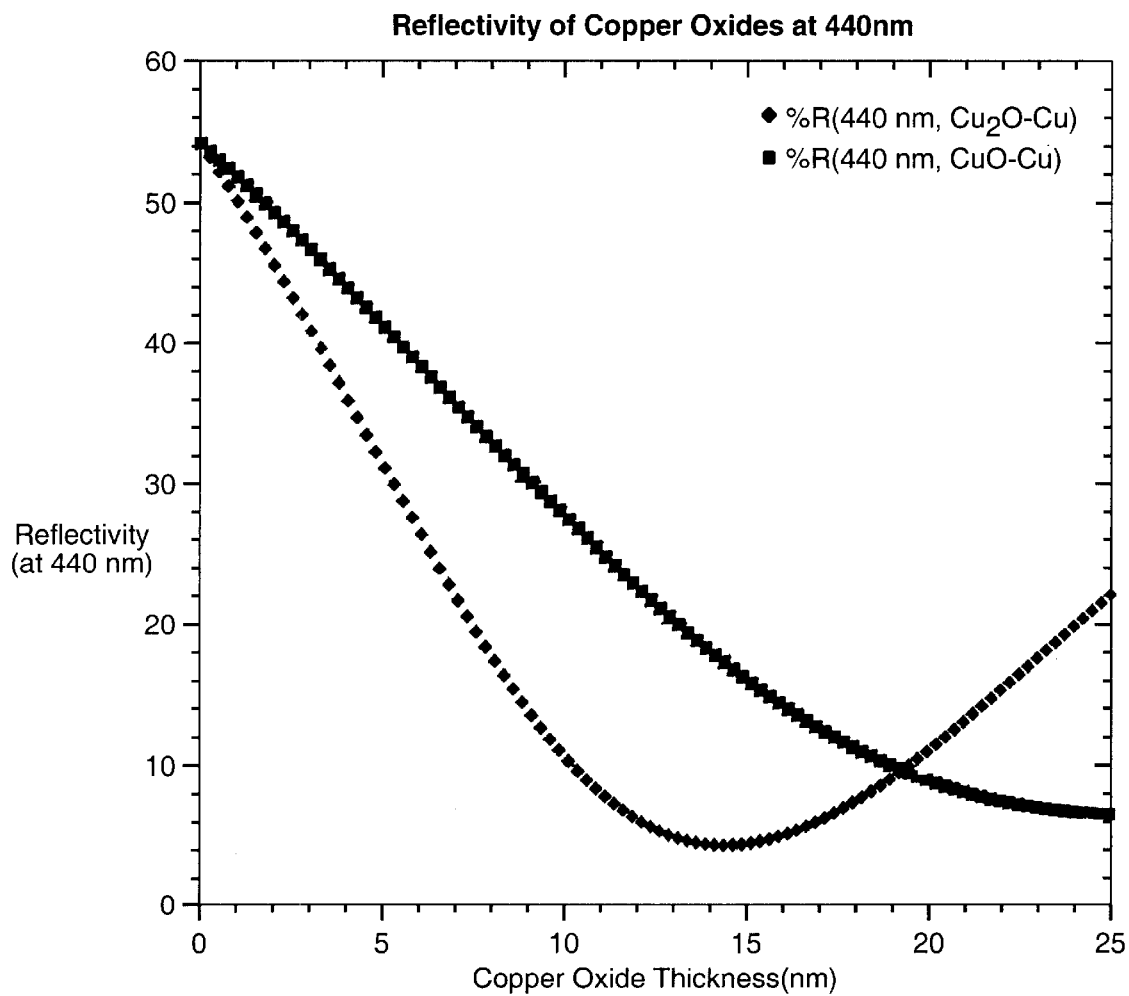
FIG._3

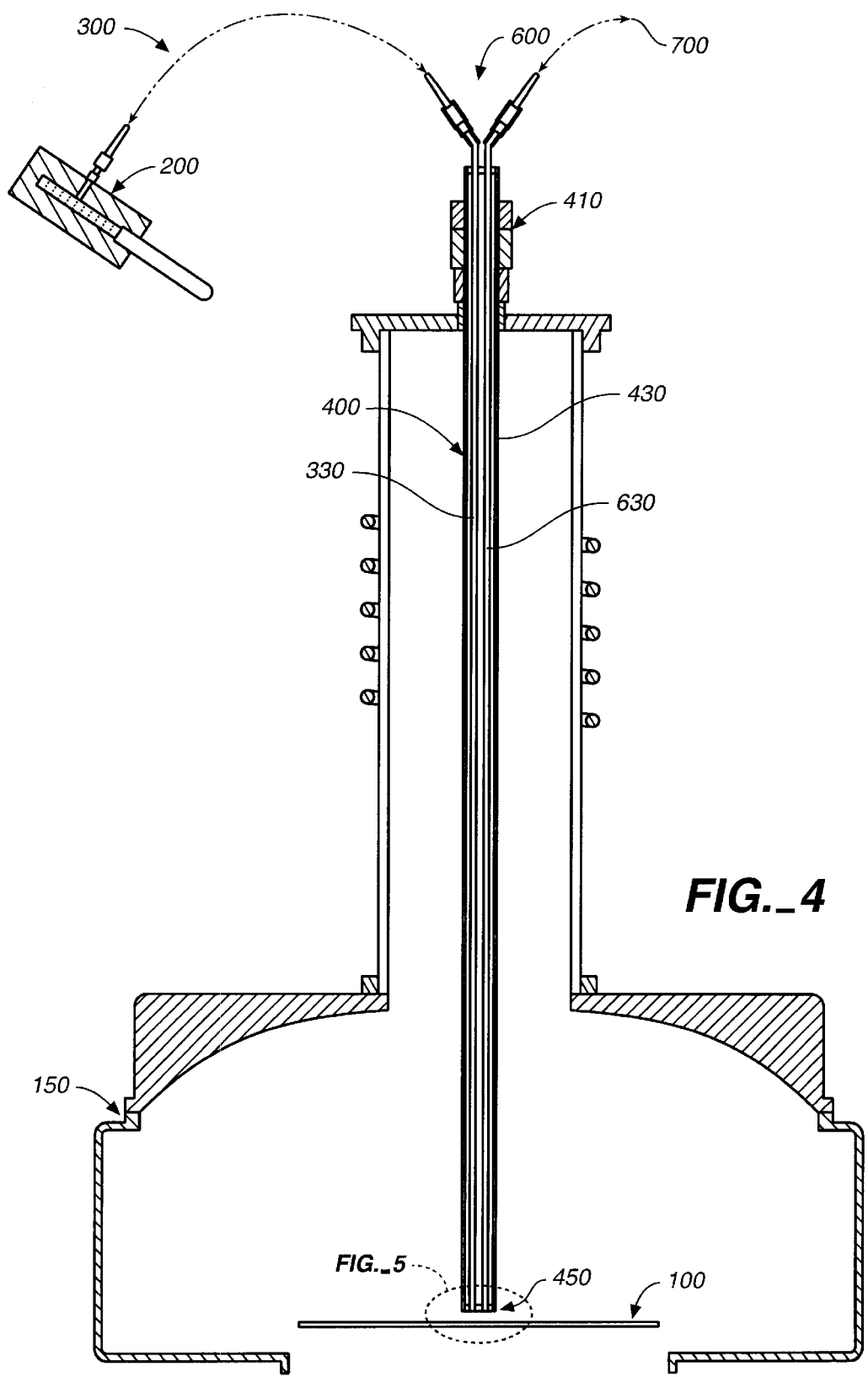
FIG._4

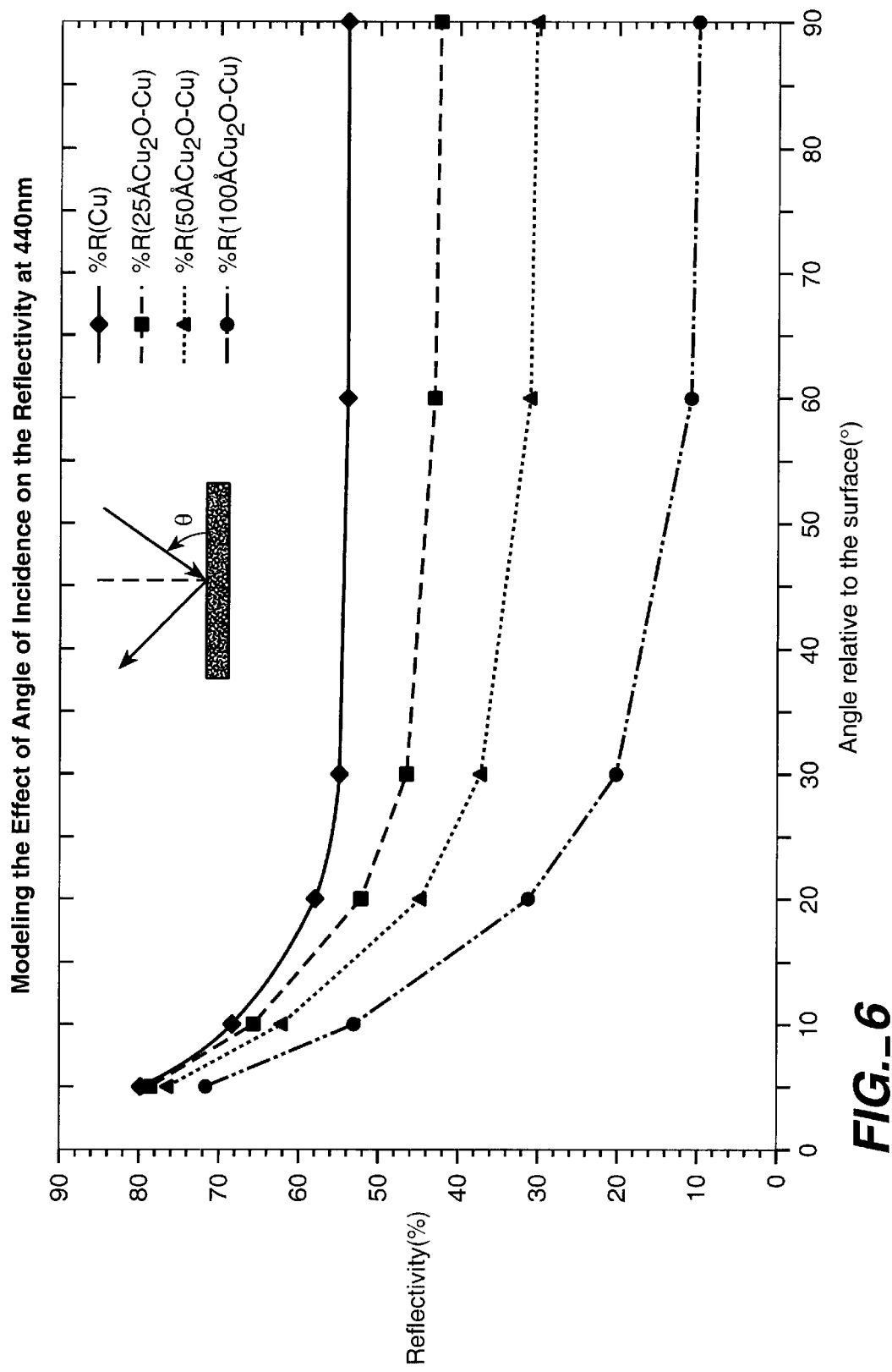
FIG._6

METHOD AND APPARATUS FOR IN-SITU MEASUREMENT OF THICKNESS OF COPPER OXIDE FILM USING OPTICAL REFLECTIVITY

BACKGROUND OF THE INVENTION

As semiconductor technology advances, device manufacturers work to reduce device sizes while they increase the density of devices on wafers. To do so, new methods and materials for device fabrication are necessary.

The move to replace standard aluminum interconnects with copper is one solution currently being implemented. Because copper has a lower resistivity than aluminum, an interconnect fabricated using copper has a lower resistance than an interconnect of the same dimensions fabricated using aluminum, which results in an increase in overall circuit speed.

However, using copper as an interconnect material poses some problems not encountered with aluminum. An important difference is that, unlike aluminum, copper does not form a self-passivating surface oxide. Therefore, as a wafer goes through different process environments and is subjected to oxidizing and reducing environments, a copper oxide layer may grow and/or shrink on the copper surface. As a result, copper films on the wafer may have an overlayer of copper oxide subsequent to processing, whose uncontrolled thickness depends on the wafer's specific process history.

An oxide overlayer can cause a number of problems due to its chemical and electrical properties. For example, it may cause poor adhesion between the copper and subsequent layers. Additionally, when a subsequent metal layer is deposited to form an ohmic contact with the copper, an intervening oxide layer will increase the electrical resistance of the contact due to its highly insulating nature.

Due to the potential problems posed by the presence of an oxide layer on copper, an inexpensive and accurate method for determining the presence and/or thickness of a copper oxide layer is required to ensure device reliability. In addition, because there are two primary oxidation states of copper ($Cu_2O$, cuprous oxide, and $CuO$, cupric oxide), the method should ideally be capable of measuring the thickness of either oxidation state. That is, the method should be applicable to films of $Cu_xO$ where x=1 or 2.

There are many ways to measure the thickness of thin metal oxide overlayers with the precision and accuracy required for semiconductor processing applications, including surface analytical methods based on electron, photon, or ion spectroscopy (e.g. Auger Electron Spectroscopy (AES), X-Ray Photoemission Spectroscopy (XPS), Rutherford Backscattering Spectroscopy (RBS) and Secondary Ion Mass Spectrometry (SIMS)) and optical methods (e.g. spectroscopic reflectivity, ellipsometry, and glancing angle X-Ray Reflection (XRR)).

Optical methods are widely used for film metrology since they are non-destructive and practical for in-situ measurement, but these methods have not been developed for the commercially important case of ultrathin films (<20 nm) of $Cu_xO$ on Cu encountered in advanced integrated circuit (IC) processing. For example, many of these optical methods involve directing the light beam against the film at a shallow angle (i.e., almost parallel to the surface of the film). This technique has been found not to be useful for thin $Cu_xO$ films, because these films are so transparent that substantial reflection takes place from the surface of the underlying substrate as well as the surface of the film. The difference between the light reflected by the surface of the substrate and the light reflected by the surface of the film cannot be "seen" by the detector.

Both XRR and ellipsometry can be used for copper oxide metrology but require expensive and complex apparatus. Additionally, optical reflectivity methods commonly used in IC processing are spectroscopic in that they probe the sample with a broad spectrum of wavelengths (for example, 200–800 nm) and then determine oxide film thickness by fitting a theoretical model of reflectivity to the measured spectrum. These methods require a costly spectrometer as well as substantial data analysis to perform the required curve fitting by which film thickness is ultimately determined.

SUMMARY OF THE INVENTION

We have recognized that the peculiar optical properties of copper oxide films allow for a considerable simplification in their thickness measurement. The current invention builds on this insight to provide an effective method and hardware for rapidly and cost-effectively determining the thickness of $Cu_xO$ on Cu films with extremely high sensitivity without the need for sophisticated spectrometers or curve fitting algorithms.

In one embodiment, the current invention includes an apparatus for performing reflectometry using a specific wavelength or a small number of specific wavelengths to detect the presence of an oxide overlayer on copper and to measure its thickness. The invention also includes a method for obtaining reflectivity data and analyzing this data to determine film thickness.

The current invention provides rapid non-destructive measurement of $Cu_xO$-on-Cu thickness, with single atomic layer (about 5 Å) sensitivity for ultrathin films with thickness about 200 Å (i.e. 20 nm) or less, but the method is not limited to such films. It is optimized for the commercially important case of $Cu_xO$-on-Cu, although it may be used with other materials that have an appropriate optical extinction coefficient, k, at one or more wavelengths. Although visible light is preferred for the case of $Cu_xO$-on-Cu, wavelengths outside of the visible spectrum may be practical for other materials. For example, infrared or ultraviolet light may provide acceptable thickness measurements for some types of films. As will be described later, we have found that the wavelength region from 350–480 nm is well suited for determination of $Cu_xO$-on-Cu thickness, with the region near 440nm providing an excellent choice due to the slope of its reflectivity versus thickness curve and the availability of a high-intensity light source.

The method works when the copper oxide is on the surface. The method can also be applied in the case where the oxidized Cu surface is partially reduced, such that the copper oxide is physically below the reduced copper surface. In this case, the Cu overlayer must be sufficiently thin (<50 nm) to allow the incident visible light to reach and reflect from the subsurface layer of $Cu_xO$.

The method can be-performed using a suitable emission line source and band pass filter so that simple photodiode detectors may be used instead of a complex and costly spectrometer (although a spectrometer may be used to detect the reflected light if desired). Therefore, the invention can provide in-situ or vacuum integrated metrology with simple, low-cost hardware. Finally, the method does not require detailed curve fitting, and thus the necessary copper oxide thickness data can be acquired rapidly and without dependence on complex curve fitting algorithms which do not always converge on a unique thickness solution.

This invention can be more fully understood in light of the following detailed description taken together with the accompanying figures.

BRIEF DESCRIPTION OF THE DRAWINGS

FIG. 1 shows the calculated spectral reflectivity of $Cu_2O$ on Cu for three different film thicknesses;

FIG. 2 shows the calculated reflectivity of $Cu_2O$ on Cu at three discrete wavelengths;

FIG. 3 shows the calculated spectral reflectivity of $Cu_2O$ and CuO on Cu at 440 nm;

FIG. 4 shows a cross-sectional view of a light pipe assembly for in-situ reflectometry according to one embodiment of the present invention;

FIG. 5 shows an enlarged view of the sampling area in the light pipe assembly of FIG. 4;

FIG. 6 shows the effect of angle of incidence on the reflectivity calculated for bare copper and three different oxide thicknesses for $\lambda=436$ nm;

DETAILED DESCRIPTION

The method is based on the recognition—revealed by modeling and confirmed by experiment—that a relatively narrow wavelength range exists in which a copper oxide overlayer can result in large changes in the reflectivity of a Cu film, and that the change in reflectivity can be used to quantify the oxide thickness with high accuracy using only a single optimized wavelength or a few discrete wavelengths. This can be understood by reference to FIG. 1 which shows the modeled normal-incidence reflectivity spectrum of $Cu_2O$ on Cu (the modeling was done using Film Wizard™, a commercially available program from Scientific Computing International, Carlsbad, Calif.). From FIG. 1, the presence of even an ultra-thin surface oxide (<5 nm) is seen to greatly reduce the reflectivity in the range of about 400–500 nm. This result was unanticipated based on what is observed with surface oxides commonly encountered in IC processing such as $SiO_2$, $Al_2O_3$, $TiO_2$ and $Ta_2O_5$. These oxides are transparent in the visible region (i.e. their extinction coefficient k is near zero) and their presence or absence has little effect on the reflectivity of the underlying substrate, unless they are quite thick. For example, a 10 nm $SiO_2$ film on Si reduces its reflectivity at 440 nm by only 1% (absolute change from about 43% to 42%), but the presence of a similar thickness $Cu_2O$ film on Cu reduces its reflectivity by nearly 45% (absolute change from about 54% to 10%).

While the effect of a $Cu_2O$ overlayer on Cu has an unexpectedly large impact on its reflectivity, we have found that this effect depends significantly on the wavelength of the incident light. This is illustrated in FIG. 2 which shows calculated reflectivity versus $Cu_2O$ thickness for wavelengths for red (630 nm), green (560 nm) and blue (440 nm) visible light. The reflectivity at 630 nm is seen to be relatively insensitive to changes in $Cu_2O$ thickness. The curve at 560 nm has a stronger dependence on $Cu_2O$ thickness; however, the curve rolls off and is less steep for films below 10 nm. In contrast, the curve at 440 nm exhibits a steep and nearly linear decrease from R=54% to 10% in the region of t=0 to 10 nm (slope $dR/dt \approx 4.4\%$ absolute per nm). Since absolute reflectivity can readily be measured to an accuracy of better than 1%, the thickness of $Cu_2O$ films below 10 nm can then be determined with an accuracy of better than (1%/4.4% per nm)=0.23 nm≈2 Å, which is comparable to a single atomic layer of copper oxide. This high sensitivity can be achieved with a low-cost, single-wavelength reflectometer and is comparable to what much more sophisticated tools provide, e.g. a spectroscopic ellipsometer.

Measurement near 440 nm offers an additional advantage related to the fact that the reflectivity of the clean Cu is highest for zero oxide thickness and is therefore single-valued for very thin copper oxide films. This advantage at 440 nm can be appreciated by reference to the 560 nm reflectivity curve shown in FIG. 2. The 560 nm reflectivity of a lightly oxidized Cu surface having <5 nm of surface oxide lies in the range of about 55–65% which, also corresponds to the reflectivity of a heavily oxidized Cu surface having $Cu_2O$ thickness in the range of about 40–50 nm. This leads to ambiguity as to whether the Cu surface is very clean or actually has a relatively thick oxide. On the other hand, the reflectivity at 440 nm is a single-valued function for oxides less than 5 nm thick, which removes the ambiguity.

Using modeling we have determined that any wavelength in the range of about 350–480 nm will achieve similar benefits to those described for 440 nm. For practical reasons, we have identified a specific wavelength within about 10 nm of 440 nm (430–450 nm) as being an excellent choice to practice the invention since this range captures a commercially important optical emission line associated with mercury vapor. In particular, Hg vapor discharge lamps exhibit a high-intensity emission line at a wavelength of about 436 nm. The IC industry has utilized such lamps and this 436 nm wavelength for many years in the practice of g-line photolithography, which facilitates the practice of the invention. This wavelength is also a good choice because the blue-sensitive cones of the human eye have a peak sensitivity at 440 nm, which facilitates optical setup and manual inspection of hardware. Because optical notch filters have a finite bandwidth and because optical spectrometers have a finite wavelength resolution and may be slightly off calibration, the emitted and/or detected reflectivity using a Hg vapor lamp may in practice be slightly different than the 435.8 nm emission line expected theoretically. Therefore, we have chosen the optimal wavelength to lie within a narrow range centered at 440 nm rather than the specific wavelength of 436 nm per se.

An additional benefit of the method is that it can be directly applied with high accuracy to both smooth and rough films. A perfectly smooth film surface under illumination exhibits a mirror-like or specular reflection such that the incident and reflected angles of the light are equal. In contrast, a rough surface exhibits diffuse reflection whereby a fraction of the reflected light is broadly scattered into a wide range of angles outside of the acceptance angle of the optical detector. This results in the measured normal incidence reflectivity value being lower than would be expected for a given film thickness, and in general leads to an erroneous film thickness determination. The quantitative relationship between the measured normal incidence reflectivity $R(\lambda)$ at a given wavelength $\lambda$ and the surface roughness is given by:

$$R(\lambda)=R_0(\lambda)\exp(-(4\pi\sigma/\lambda)^2) \qquad \text{Equation 1:}$$

where $\sigma$ is the root mean square (rms) roughness of the surface, and $R_0(\lambda)$ is the reflectivity of the same surface if it were perfectly smooth surface ($\sigma=0$). Since the $Cu_xO$ thickness of interest (0–50 nm) is much smaller than the optimized wavelength near 440 nm, the ratio $\sigma/\lambda$ is <<1 and the effect of film roughness will be negligible. For example, with reference to FIG. 2, the reflectivity $R_0$ of a perfectly smooth 10 nm $Cu_2O$ film on Cu at 440 nm would be about 10.6%. If the 10 nm film were very rough, say with an rms roughness equal to one half of the film thickness, the measured reflectivity is found from Equation 1 to be about 10.4%. This would lead one to overestimate the film thickness by about 0.1 nm (1.0 Å) which is negligible.

In order to develop a reduction algorithm to calculate copper oxide thickness, the relationship between surface reflectivity and film thickness must be known. In this case, the general formula for the reflectivity of an absorbing film on an absorbing substrate must be used since both Cu and its oxide strongly absorb visible light. The expression for R(t) for a single absorbing layer on an absorbing substrate is given in *Optical Properties of Thin Solid Films*, O. S. Heavens (Dover Publications, Inc., 1991). For a given wavelength of light $\lambda$ (in nm), the film is assumed to have an index of refraction $n_1$ and an extinction coefficient $k_1$, the medium above the film has an index of refraction $n_0$, the substrate has an index of refraction $n_2$ and an extinction coefficient $k_2$, the film thickness is t (in nm). The reflectivity is then given in Equation 2 below:

Equation 2:
$$R(t) = \frac{(g_1^2 + h_1^2)e^{\alpha t} + (g_2^2 + h_2^2)e^{-\alpha t} + A\cos\gamma + B\sin\gamma}{e^{\alpha t} + (g_1^2 + h_1^2)(g_2^2 + h_2^2)e^{-\alpha t} + C\cos\gamma + D\sin\gamma}$$

where:
$A = 2(g_1 g_2 + h_1 h_2)$
$B = 2(g_1 h_2 - g_2 h_1)$
$C = 2(g_1 g_2 - h_1 h_2)$
$D = 2(g_1 h_2 + g_2 h_1)$
$\alpha = 4\pi k_1/\lambda$ (radians)
$\gamma = 4\pi n_1/\lambda$ (radians)

$$g_1 = \frac{n_0^2 - n_1^2 - k_1^2}{(n_0 + n_1)^2 + k_1^2}$$

$$g_2 = \frac{n_1^2 - n_2^2 + k_1^2 - k_2^2}{(n_1 + n_2)^2 + (k_1 + k_2)^2}$$

$$h_1 = \frac{2n_0 k_1}{(n_0 + n_1)^2 + k_1^2}$$

$$h_2 = \frac{2(n_1 k_2 - n_2 k_1)}{(n_1 + n_2)^2 + (k_1 + k_2)^2}$$

Equation 2 can be considerably simplified for a particular choice of materials and wavelength, since the optical constants n and k are then well-defined numbers. For the case of $Cu_2O$ on Cu and $\lambda=440$ nm, Equation 2 leads, with some algebraic manipulation, to the following formula:

Equation 3:
$$R(t) = \frac{(0.3008)(e^{\alpha t} + 0.8459\, e^{-\alpha t} - 1.8394\cos(\gamma t - 1.3958))}{e^{\alpha t} + 0.0765\, e^{-\alpha t} - 0.5531\cos(\gamma t - 1.1415)}$$

where R(t) is the reflectivity in percent, and t is the thickness of $Cu_2O$ in nm. In applying Equation 2, the irradiated sample is assumed to be in a medium with $n_0 \approx 1$ such as air or vacuum. The optical constants of bulk Cu at 436nm are $n_2=1.17117$ and $k_2=2.34922$, and the index of refraction $n_1$ and extinction coefficient $k_1$ for $Cu_2O$ at 440 nm are $n_1=3.28616$ and $k_1=0.65354$. Hence, $\alpha=4\pi k_1/\lambda=0.018665$ nm$^{-1}$, and $\gamma=4\pi n_1/\lambda=0.09385$ nm$^{-1}$.

The above expression for R(t) is valid for any $Cu_2O$ film thickness; however, oxidized Cu films encountered in IC processing are often less than about 10 nm thick. For films that are less than about 10 nm thick, we have found it convenient to approximate the above formula with a third-order polynomial in film thickness t, namely:

$$R_{440\,nm} = 54.28 - 4.035t - 0.1959t^2 + 0.0164t^3 \quad \text{Equation 4:}$$

where t is the thickness in nm and R is the reflectivity at 440 nm in percent. Equation 4 is representative of a best fit to Equation 3 over the 0 to 10 nm range of $Cu_2O$ thickness; however, the precise values of the coefficients in Equation 4 will change slightly depending on the boundary conditions and number of points used to fit Equation 3. Using the particular approximation shown, the reflectivity of a 10 nm $Cu_2O$ on Cu is estimated to be 10.7% versus a nearly identical value of 10.6% calculated using the more exact Equation 3. If preferred, Equation 4 can be used as a look-up table to determine film thickness from measured reflectivity, or formally inverted to give an equation for thickness t as a function of R. Similar algorithms can be developed for different wavelengths or for different substrate-film combinations.

As noted earlier, Cu exists in two primary oxidation states and therefore has two common oxides. In this regard, the method of film thickness determination is equally suitable for measurement of thin cupric oxide (CuO) films on Cu, although the optical constants of CuO are different from those of $Cu_2O$ and lead to reduction algorithms of similar form but with different numerical constants. The same optimum range of wavelength (380–460 nm) is found to apply for CuO, and thickness determination films can conveniently be made at near 440 nm as with $Cu_2O$. FIG. 3 shows the calculated reflectivity of CuO films on Cu at 440 nm, and the equations for CuO corresponding to Equations 3 and 4 for $Cu_2O$ are found to be as follows:

Equation 5:
$$R(t) = \frac{(0.2152)(e^{\alpha t} + 0.8191\, e^{-\alpha t} - 1.8101\cos(\gamma t + 1.2544))}{e^{\alpha t} + 0.0379\, e^{-\alpha t} - 0.3895\cos(\gamma t - 1.3311)}$$

where R(t) is the reflectivity in percent, and t is the thickness of CuO in nm. The index of refraction $n_1$ and extinction coefficient $k_1$ for CuO at 440 nm are $n_1=2.42943$ and $k_1=0.78816$. Hence, $\alpha=4\pi k_1/\lambda=0.022510$ nm$^{-1}$, and $\gamma=4\pi n_1/\lambda=0.06938$ nm$^{-1}$.

$$R_{440\,nm} = 54.28 - 2.363t - 0.0692t^2 + 0.0038t^3 \quad \text{Equation 6:}$$

In accordance with the present invention, reflectometry can be performed with a small number of specific wavelengths (preferably only one or two) in-situ in order to detect the presence of, or measure the thickness of, a copper oxide overlayer. FIG. 4 shows a reflectometer assembly that may be used to perform such an in-situ thickness measurement.

Referring to FIG. 4, a wafer 100 has a copper layer deposited upon at least a portion of its surface. An oxide overlayer, which may be CuO or $Cu_2O$, may exist on the surface of the copper layer. Wafer 100 is contained within a process chamber 150 or atmospheric loadlock. A chamber that is vacuum-compatible is preferred since this allows the method to be used during process steps that require sub-atmospheric pressure or with controlled gas ambients, be they inert, reducing or oxidizing. However, the optical determination of $Cu_xO$ film thickness is not restricted to a sub-atmospheric, vacuum ambient and can readily be practiced with the sample at atmospheric pressure. This would not be possible with a surface analysis method that utilizes ion bombardment (e.g. SIMS) or electron bombardment (e.g. AES). The method is also suitable for use with the wafer at pressures much greater than atmospheric such as would be encountered in a high pressure oxidation furnace (>20 atm) or in an ultra-high pressure vessel such as used in supercritical fluid cleaning or film deposition where pressures can exceed 200 atm. In the latter case, it is desirable that the supercritical fluid be optically transparent at the preferred wavelength(s), which condition is satisfied in the visible for commonly used supercritical fluids such as $CO_2$ and $H_2O$. The presence and/or thickness of an oxide overlayer is determined using a reflectometer assembly 10, which includes an in-situ lightpipe assembly 400. Reflectometer assembly 10 is positioned above a region on wafer 100 which contains the copper film to be measured, such that a lightpipe assembly end 450 is close to the surface of wafer 100. Typically, thickness measurements are performed with the lightpipe assembly end 450 a few millimeters from the surface of wafer 100 which increases the incident and detected optical signal strength and allows for near-normal incidence and detection angles. Greater spacing could be used, but may require additional focusing and detection optics to optimize optical signal strength.

A Hg(Ar) vapor lamp assembly 200 is a convenient light source. Lamp assembly 200 provides light of a specific wavelength which has an intensity $I_1$. Lamp assembly 200 may include a narrow-pass optical filter to isolate the specific wavelength of light (not shown); alternatively, the specific wavelength may be isolated during detection by use of a narrow-pass optical filter or a grating spectrometer. As discussed earlier, a preferred wavelength for this embodiment is near 440 nm. Although very good thickness measurements can be made for film thicknesses ranging from 0–10 nm using light in the range of about 360 to 480 nm, light near 440 nm is easy to obtain using the Hg/Ar discharge lamp assembly. Discharge lamps containing Hg vapor or gas admixtures such as Hg(Ar) or Hg(Ne) provide a high intensity emission line at 435.8 nm; however, other gas discharges and light sources can be used depending on the optical response of the film to be measured. For example, one could employ an incandescent filament bulb, a fluorescent light, or a continuous wave or pulsed laser.

The source light is transmitted from lamp assembly 200 through a source optical fiber 300 which is connected at one end to lamp assembly 200. The source light is then transmitted through a source lightpipe 330, which is connected to the other end of source optical fiber 300. The light exits source lightpipe 330 at the lightpipe assembly end 450.

Referring to FIG. 4, light exiting the lightpipe assembly end 450 is incident upon the surface of the copper layer on wafer 100. Some of the light is reflected and some is absorbed. The reflected light has an intensity $I_2$. Some of the reflected light enters a return signal optical lightpipe 630. The reflected light is transmitted through return signal optical lightpipe 630, then through a signal optical fiber 600, which is connected to return signal optical lightpipe 630. The reflected light is then transmitted to a signal measurement device 700, which is connected to the other end of signal optical fiber 600 and which measures (directly or indirectly) the intensity $I_2$ of the reflected light. Signal measurement device 700 may isolate the light of the specific wavelength; for example, it may include an optical filter or grating to isolate the desired emission line, in this case 436 nm. A value for the reflectivity is then computed using a method such as that described below, and the thickness of the oxide layer is determined by using a formula relating reflectivity and film thickness such as Equation 4 or a look-up table constructed from such a formula Theoretically, the reflectivity of the surface is equal to $I_2/I_1$. However, $I_1$ and $I_2$ are typically not measured directly. Instead, it is their ratio that is determined. For example, the source intensity $I_1$ may not be measured at all, while signal measurement device 700 may not measure $I_2$ directly; rather, it may count the number of detected photons which, due to instrumental transmission losses, detector sensitivity, etc. will not in general be equal to $I_2$. In such a case, the apparatus must first be calibrated using a surface of a known reflectivity. Polished, bare silicon (e.g. a silicon wafer) is a surface that can be used for calibration, since silicon is well-characterized and forms an ultrathin, self-passivating native oxide of $SiO_2$. Alternatively, a different reference surface such as a gold or aluminum mirror may be used. Once the apparatus is calibrated, it can be used to measure the presence and/or thickness of a copper oxide layer on copper.

As FIG. 5 shows, the incident light is approximately normal to the surface of wafer 100. Many optical methods use radiation that is incident to the surface at a shallow or glancing angle (less than about 10–20° with respect to the surface) to improve sensitivity for thin films or for the convenience of spatially separating the incident from reflected light beams. However, for the method of the current invention, measuring the reflectivity near normal incidence angle is preferred. FIG. 6 illustrates, by calculation, the effect of the angle of incidence on the reflectivity measurement made using the 436 nm emission from a Hg-vapor lamp. In FIG. 6, the angle of incidence θ is measured with respect to the surface (θ=0° is parallel to the wafer surface, while θ=90° is perpendicular to the wafer surface). At normal incidence (θ=90°), the 436 nm reflectivity of a bare copper surface is about 54%, while the reflectivity of a 10 nm $Cu_2O$ film on Cu is slightly over 10% which is significantly different from that of the bare Cu. However, as the angle of incidence changes from normal incidence towards grazing incidence, the difference between the two values decreases. At the smallest angle of incidence shown in the graph (θ=5°), the reflectivity of bare copper is about 80% while the reflectivity of the oxidized Cu has a reflectivity of about 73% which is not significantly different from that of the bare Cu. This results in the reflectivity of the $Cu_2O/Cu$ stack being relatively insensitive to small changes in $Cu_2O$ thickness. Therefore, reflectivity is preferably measured at close to normal incidence for optimum sensitivity, although the method can also be practiced at larger angles (within about 30° to the normal incidence) if desired for reasons of convenience. A further benefit of normal incidence reflectivity is that the incident and reflected beams can share a common lightpipe assembly.

Referring again to FIG. 4, lightpipe assembly 400 includes a vacuum feed-through 410, a vacuum enclosure 430, source lightpipe 330, return signal lightpipe 630, and lightpipe assembly end 450. Vacuum enclosure 430 is preferably an ultrahigh vacuum (UHV) compatible material; for example, stainless steel or aluminum. Vacuum enclosure 430 is placed within process chamber 150 through feed-through 410 the interior of vacuum enclosure 430 need not be at any particular pressure; it is usually maintained at atmospheric pressure when the vessel is under vacuum or at atmospheric pressure.

Lightpipe assembly end 450 provides a vacuum tight seal, while it allows light to be transmitted from the end of source lightpipe 330 to the wafer and reflected light to enter the end of the return signal lightpipe 630. Lightpipe assembly end 450 may be made of quartz that is fused to the end of vacuum enclosure 430. The ends of source lightpipe 330 and signal lightpipe 630 are fused to lightpipe assembly end 450 so that the portion of the lightpipe assembly 400 that is inside process chamber 150 is vacuum tight.

Lightpipe assembly end 450 is polished to be optically flat.

Although the method and apparatus of the current invention can be used to determine the thickness of an unwanted copper oxide film, they can be used in additional ways as well. For example, if an oxide film of a particular thickness is desired, the invention can be used as an endpoint detector. The reflectivity can be measured while the oxide is grown and the process terminated once the desired reflectivity (corresponding to the desired film thickness) has been obtained.

Additionally, the method and apparatus can be used to determine whether the copper film is sufficiently clear of oxide to proceed to the next process step. In some semiconductor processing applications, the exact thickness of the copper oxide is not important. Instead, it is important that the thickness be below a certain threshold level. In that case, a flag may be set at a particular reflectivity level that corresponds to a copper surface that is sufficiently "clean" for the process. For example, after a processing step that results in an oxide layer being inadvertently formed on a copper film, a cleaning process may be performed before subsequent film deposition. In order to determine when the oxide has been sufficiently removed, a flag is set that corresponds to a predetermined acceptable oxide thickness. The reflectivity is monitored, and once it reaches the flag value, the surface is acceptably clean of oxide and the cleaning process may be terminated. For example, suppose it were known that a copper surface having a $Cu_2O$ film <2 nm is sufficiently clean to allow a subsequent process step to proceed. By reference to FIG. 3, a reflectivity flag could then be set whereby a measured 440 nm reflectivity value greater than 48% would be required to terminate the cleaning process.

The apparatus and method described above pertain to one embodiment of the invention. Other embodiments are possible. Different light sources may be used; for example, a continuous wave (CW) or a pulsed laser, a fluorescent light tube, incandescent light or glow bar, or a different gas emission lamp than Hg or Hg/Ar may be used. The method has been performed using the blue emission from a conventional fluorescent room light. Additionally, other methods and apparatus for transmitting light to and from the surface may be used, as long as they are compatible with the temperatures that may be encountered during wafer processing and may be used in a vacuum chamber. For example, if a laser is used as a light source the fiber optic and lightpipe elements described above may be omitted and other optical elements such as mirrors used to direct the light. Similarly, there are many methods that may be used to measure the reflected light.

Although thickness measurements are preferably performed in-situ within the process chamber, in another embodiment of the current invention, the presence and/or thickness of an oxide layer can be measured ex-situ; that is, outside of the processing chamber. This could be done on another process module or region of a vacuum-integrated cluster tool or, after air exposure, on a stand-alone metrology tool. For example, the method of the current invention can be used in conjunction with commercial inspection tools such as a spectroscopic ellipsometer offering a reflectivity capability (e.g. the UV1250 SE ellipsometer from KLA-Tencor, San Jose, Calif.) or other suitable apparatus. In order to perform an ex-situ thickness measurement, the wafer can be moved out of the processing chamber to a chamber with a view port, for example the external load lock of a cluster tool. The reflectivity is then measured by shining light through the view port and measuring the reflected light. This may be done with the sample at vacuum or ambient pressure. Alternatively, an ex-situ measurement can be made on a stand-alone tool, physically separated from the process tool.

The current invention is most easily performed when measuring the thickness of oxide formed on a blanket film of copper or on patterned wafers that comprise a two-dimensional array of metal lines. However, the thickness of oxide on copper films in highly patterned, three dimensional structures may be inferred in the following manner. A coupon may be reserved on a wafer and a copper film formed in the coupon area. As the wafer undergoes subsequent processing, the presence and/or thickness of any copper oxide on the copper in the coupon area can be measured using the method and apparatus of the current invention and the presence and/or thickness of a copper oxide overlayer on the patterned portions of the wafer inferred. Alternatively, an unpatterned Cu region on the actual wafer could be directly interrogated if the spatial extent of the Cu region were greater than the diameter of the incident light spot on the wafer.

The method and apparatus of the current invention may be used to measure the existence or thickness of a copper oxide layer at a single point on the wafer, or multiple thickness measurements may be made. For example, the reflectometer assembly may move relative to the wafer in order to measure the thickness at more than one location on the wafer. Alternately, light may be reflected off a number of locations on the wafer at the same time to perform multiple thickness measurements.

Although the method of the invention may be performed using a single wavelength of light as described above, under certain circumstances it may be useful to perform the method using two or more wavelengths of light. FIG. 2 shows the reflectivity of $Cu_2O$ on Cu for three wavelengths: 630 nm, 560 nm, and 440 mn. As FIG. 2 shows, the reflectivity obtained using a given wavelength may correspond to more than one possible $Cu_2O$ thickness. For example, using 440 nm light, a reflectivity value of 20% may correspond to a $Cu_2O$ layer that is about 7 nm thick or one that is about 25 nm thick. This is normally not a problem, since the unwanted oxide layers that form during semiconductor processing are typically 0–5 run thick (0 to 50 Å), where a given reflectivity corresponds to a single thickness for each of the wavelengths.

However, if the thickness of an oxide layer falls outside the range where the reflectivity corresponds to a single thickness, a second wavelength can be used to determine the thickness of the layer without ambiguity. In the example cited above, if the reflectivity of 440 mn light was 20%, a second wavelength can be used to determine whether the layer thickness is 7 nm or 25 nm. If the second wavelength is 560 nm, its reflectivity will be either about 50% (for a 7 nm layer) or about 14% (for a 25 nm layer). Alternatively, the ratio of the reflectivities obtained using two wavelengths can be used to determine the layer thickness.

Generally, if the measurement scheme being used allows measurement of a change in reflectivity of $\Delta R$, the current invention can be used to measure the thickness of a $Cu_xO$ film with a thickness of $t_0$ to a sensitivity of $\Delta t$, if at $t_0$:

Equation 7:

$$\frac{\Delta R}{\Delta t} \le \frac{dR(t)}{dt}$$

where R(t) is given by Equation 2 for an absorbing film on an absorbing substrate. Note that R(t) depends on the wavelength used, and for a given thin film material there may be some wavelengths that provide acceptable film thickness sensitivity, while other wavelengths do not.

For 440 nm light, the slope dR/dt allows a change in film thickness of about 0.5 nm (5 Å) to be measured for a 10 nm $Cu_2O$ film, providing excellent sensitivity to changes in thickness on the order of a single atomic layer of oxide.

The above-described embodiments of the present invention are merely meant to be illustrative and are not limiting. It will thus be obvious to those skilled in the art that various changes and modifications may be made without departing from this invention in its broader aspects. Therefore, the appended claims encompass all such changes and modifications as fall within the true spirit and scope of this invention.

We claim:

1. A method for measuring the thickness of a copper oxide film on a copper film, comprising:
   producing light that includes light of a specific wavelength;
   transmitting said light to said copper oxide film, such that some of said light is reflected, said reflected light including light of said specific wavelength;
   detecting a detected amount of said reflected light of said specific wavelength;
   determining the reflectivity of said copper oxide film using said detected amount; and
   determining the thickness of said copper oxide film using said reflectivity,
   wherein said reflectivity is measured in percent and said reflectivity is denoted by R, said copper oxide film comprises cuprous oxide ($Cu_2O$), said thickness of said copper oxide film is measured in nanometers, said thickness of said copper oxide film is denoted by t, said thickness of said copper oxide film is less than about 15 nm, and wherein said thickness of said copper oxide film is determined using the following relationship:

$R=54.28-4.035t-0.1959t^2+0.0164t^3$.

2. A method for measuring the thickness of a copper oxide film on a copper film, said method comprising:
   producing light that includes light of a specific wavelength;
   transmitting said light to said copper oxide film, such that some of said light is reflected, said reflected light including light of said specific wavelength;
   detecting a detected amount of said reflected light of said specific wavelength;
   determining the reflectivity of said copper oxide film using said detected amount; and
   determining the thickness of said copper oxide film using said reflectivity,
   wherein said reflectivity is measured in percent, said reflectivity is denoted by R, said copper oxide film comprises cupric oxide (CuO), said thickness of said copper oxide film is measured in nanometers, said thickness of said copper oxide film is denoted by t, said thickness of said copper oxide film is less than about 15 nm, and wherein said thickness of said copper oxide film is determined using the following relationship:

$R=54.28-2.363t-0.0692t^2+0.0038t^3$.

3. The method of claim 1 or claim 2, wherein transmitting said light to said copper oxide film comprises transmitting said light in a direction that is within about 30 degrees of a direction normal to a surface of said copper oxide film.

4. The method of claim 1 or claim 2, wherein transmitting said light to said copper oxide film comprises transmitting said light in a direction that is substantially normal to a surface of said copper oxide film.

5. A method for determining whether a copper oxide film thicker than a specific thickness is present on a copper film, said method comprising:
   determining a reference reflectivity corresponding to a copper oxide film of said specific thickness;
   producing light that includes light of a specific wavelength;
   transmitting said light to a first area on said copper film, such that some of said light is reflected, said reflected light including light of said specific wavelength;
   detecting a detected amount of said reflected light of said specific wavelength;
   determining a measured reflectivity using said detected amount; and
   determining whether a copper oxide film thicker than said specific thickness is present on said copper layer by comparing said measured reflectivity to said reference reflectivity.

6. A method for determining whether a copper oxide film thinner than a specific thickness is present on a copper film, said method comprising:
   determining a reference reflectivity corresponding to a copper oxide film of said specific thickness;
   producing light that includes light of a specific wavelength; transmitting said light to a first area on said copper film, such that some of said light is reflected, said reflected light including light of said specific wavelength;
   detecting a detected amount of said reflected light of said specific wavelength;
   determining a measured reflectivity using said detected amount; and
   determining whether a copper oxide film thinner than said specific thickness is present on said copper layer by comparing said measured reflectivity to said reference reflectivity.

7. A method for measuring the thickness of a copper oxide film on a copper film, said method comprising:
   producing light that includes light of a first specific wavelength and a second specific wavelength;
   providing a copper film including a first area;
   transmitting said light to said first area, such that some of said light is reflected, said reflected light including light of said first specific wavelength and said second specific wavelength;
   detecting a first detected amount of said first specific wavelength and a second detected amount of said second specific wavelength;
   determining a measured reflectivity of said first area using said first detected amount and said second detected amount; and determining the thickness of a copper oxide film on said copper film using said measured reflectivity.

8. The method of claim 7, wherein determining the thickness of a copper oxide film comprises determining the thickness when the reflectivity of reflected light of said first specific wavelength, the reflectivity of reflected of light of said second specific wavelength, or both, corresponds to more than one thickness of copper oxide film.

9. The method of claim 7, wherein determining the thickness of a copper oxide film comprises determining a ratio of the reflectivity of reflected light of said first specific wavelength and the reflectivity of reflected light of said second specific wavelength.

10. The method of any one of claims 5 and 6, wherein said specific wavelength is between about 350 nm and 480 nm.

11. The method of any one of claims 5 and 6, wherein said specific wavelength is between about 380 nm and 460 nm.

12. The method of any one of claims 1, 2, 5 and 6, wherein said specific wavelength is between about 430 nm and 450 nm.

* * * * *